US012272172B2

(12) United States Patent
Hwang et al.

(10) Patent No.: US 12,272,172 B2
(45) Date of Patent: Apr. 8, 2025

(54) METHOD AND DEVICE FOR HUMAN PARSING

(71) Applicant: AJOU UNIVERSITY INDUSTRY-ACADEMIC COOPERATION FOUNDATION, Gyeonggi-do (KR)

(72) Inventors: Won Jun Hwang, Seoul (KR); Kun Liang Liu, Tianjin (CN)

(73) Assignee: AJOU UNIVERSITY INDUSTRY-ACADEMIC COOPERATION FOUNDATION, Gyeonggi-do (KR)

( * ) Notice: Subject to any disclaimer, the term of this patent is extended or adjusted under 35 U.S.C. 154(b) by 376 days.

(21) Appl. No.: 17/839,443

(22) Filed: Jun. 13, 2022

(65) Prior Publication Data

US 2022/0398865 A1 Dec. 15, 2022

(30) Foreign Application Priority Data

Jun. 14, 2021 (KR) .......................... 10-2021-0076804

(51) Int. Cl.
*G06V 40/16* (2022.01)
*G06T 7/246* (2017.01)
*G06V 10/77* (2022.01)

(52) U.S. Cl.
CPC ............ *G06V 40/166* (2022.01); *G06T 7/246* (2017.01); *G06V 10/7715* (2022.01); *G06T 2207/30196* (2013.01)

(58) Field of Classification Search
CPC .. G06V 40/166; G06V 10/7715; G06T 7/246; G06T 2207/30196
See application file for complete search history.

(56) References Cited

U.S. PATENT DOCUMENTS

2020/0272812 A1* 8/2020 Wang .................... G06T 7/11

FOREIGN PATENT DOCUMENTS

KR 20210055747 A 5/2021

OTHER PUBLICATIONS

Zhang, Ziwei, et al., "Correlating Edge, Pose with Parsing," 2020, pp. 8900-8909.

* cited by examiner

*Primary Examiner* — Diane D Mizrahi
(74) *Attorney, Agent, or Firm* — Foley & Lardner LLP (57) ABSTRACT

Provided are a device and method for human parsing. The method includes receiving at least one piece of image data and ground truth values for human parsing, generating a height distribution map and a width distribution map for the image data, acquiring attention maps and scaled feature maps for each of a height and a width of the image data using the distribution maps, calculating a distribution loss rate by concatenating the scaled feature maps, acquiring an improved feature map on the basis of the calculated distribution loss rate, and performing human parsing on an object included in the image data using the improved feature map.

18 Claims, 4 Drawing Sheets

METHOD AND DEVICE FOR HUMAN PARSING

CROSS-REFERENCE TO RELATED APPLICATION

This application claims priority to and the benefit of Korean Patent Application No. 10-2021-0076804, filed on Jun. 14, 2021, the disclosure of which is incorporated herein by reference in its entirety.

BACKGROUND

1. Field of the Invention

The present invention relates to a method and device for human parsing using spatial distribution.

2. Discussion of Related Art

Human parsing includes a task of segmenting a human image into body parts, such as a head, arms, legs, etc., and compositional parts such as clothes. Such human parsing is performed using an artificial intelligence (AI)-based deep learning technology. However, accurate human parsing is difficult due to the complex textures and styles of clothes, variations of human poses, and various other reasons.

To this end, fully convolutional networks (FNCs) were developed. However, FNCs overlook spatial and statistical characteristics of the human body, such as the left and right arms always being present on both sides of the human body, and thus have drawbacks in that human parsing takes a long time and memory utilization is lowered.

SUMMARY OF THE INVENTION

The present invention is directed to providing a method and device for human parsing using spatial distribution which enable a user to check a spatial distribution feature of body parts using an attention mechanism based on spatial distribution according to spatial statistics.

According to an aspect of the present invention, there is provided a method for human parsing, the method including receiving at least one piece of image data and ground truth values for human parsing, generating a height distribution map and a width distribution map for the image data, acquiring attention maps and scaled feature maps for each of a height and a width of the image data using the distribution maps, calculating a distribution loss rate by concatenating the scaled feature maps, acquiring an improved feature map on the basis of the calculated distribution loss rate, and performing human parsing on an object included in the image data using the improved feature map.

The generating of the height distribution map and the width distribution map may include encoding each class integer label of the ground truth values to generate a matrix, and generating the height distribution map having a size of the height of the image data*a class number and generating the width distribution map having a size of the width of the image data*the class number.

The method may further include, after the generating of the height distribution map and the width distribution map, accumulating the height distribution map and the width distribution map, which are interpolated according to the width and the height, to acquire a class spatial-distribution ground truth value which has a size of the height*the width and reflects spatial distribution of all classes.

The acquiring of the attention map and the scaled feature maps may include acquiring the attention maps for each of the height and the width on the basis of an input feature map of the image data.

The method may further include, after the acquiring of the attention maps, interpolating the attention maps to the same size as the input feature map and multiplying the interpolated attention maps by the input feature map to acquire the scaled feature maps for each of the height and the width.

The calculating of the distribution loss rate may include calculating a distribution loss rate for each of the height and the width and applying different weights to the calculated distribution loss rates to calculate a final distribution loss rate.

The calculating of the distribution loss rate for each of the height and the width may include calculating the distribution loss rate for the height using the height, the class number, a height-channel prior map, and a ground truth height-channel attention map and calculating the distribution loss rate for the width using the width, the class number, a width-channel prior map, and a ground truth width-channel attention map.

The acquiring of the improved feature map may include acquiring the improved feature map for the image data on the basis of the calculated final distribution loss rate.

The method may further include, after the performing of the human parsing on the object, displaying a human parsing result for the image data when learning of the image data is completed.

According to another aspect of the present invention, there is provided a device for human parsing, the device including an input part configured to receive at least one piece of image data and ground truth values for human parsing, and a controller configured to generate a height distribution map and a width distribution map for the image data, acquire attention maps and scaled feature maps for each of a height and a width of the image data using the distribution maps, acquire an improved feature map on the basis of a distribution loss rate calculated by concatenating the scaled feature maps, and perform human parsing on an object included in the image data.

The controller may encode each class integer label of the ground truth values to generate a matrix, generate the height distribution map having a size of the height of the image data*a class number, and generate the width distribution map having a size of the width of the image data*the class number.

The controller may accumulate the height distribution map and the width distribution map, which are interpolated according to the width and the height, to acquire a class spatial-distribution ground truth value which has a size of the height*the width and reflects spatial distribution of all classes.

The controller may acquire the attention maps for each of the height and the width on the basis of an input feature map of the image data.

The controller may interpolate the attention maps to the same size as the input feature map and multiply the interpolated attention maps by the input feature map to acquire the scaled feature maps for each of the height and the width.

The controller may calculate a final distribution loss rate by applying different weights to distribution loss rates calculated for each of the height and the width.

The controller may calculate the distribution loss rate for the height using the height, the class number, a height-channel prior map, and a ground truth height-channel attention map and calculate the distribution loss rate for the width using the width, the class number, a width-channel prior map, and a ground truth width-channel attention map.

The controller may acquire the improved feature map for the image data on the basis of the calculated final distribution loss rate.

The controller may derive a human parsing result for the image data when learning of the image data is completed.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Hereinafter, exemplary embodiments of the present invention will be described in detail with reference to the accompanying drawings. Detailed description of the present invention to be disclosed below with the accompanying drawings is intended to illustrate exemplary embodiments of the present invention rather than to illustrate the only embodiment of the present invention. To clearly describe the present invention, parts irrelevant to the present invention may be omitted in the drawings. Throughout the drawings, like reference numerals refer to like elements.

Figure 1:
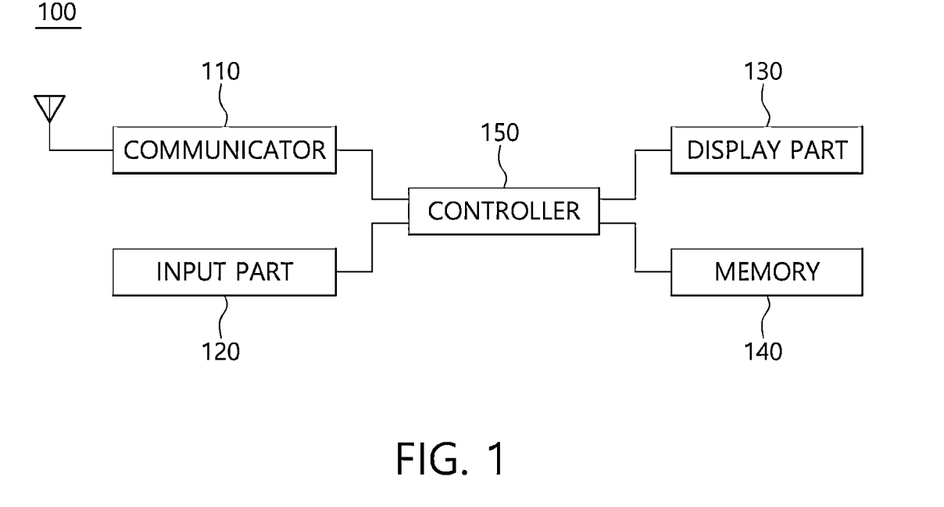
FIG. 1 is a block diagram of a device for human parsing according to an exemplary embodiment of the present invention.

FIG. 1 is a block diagram of a device for human parsing according to an exemplary embodiment of the present invention.

Referring to FIG. 1, a device 100 for human parsing (hereinafter, "electronic device 100") according to the present invention includes a communicator 110, an input part 120, a display part 130, a memory 140, and a controller 150.

The communicator 110 collects image data from an external server through communication with the external server (not shown) or an external device (not shown) and provides the image data to the controller 150. To this end, the communicator 110 performs wireless communication such as fifth generation (5G), Long Term Evolution-Advanced (LTE-A), LTE, Wi-Fi, etc.

The input part 120 generates input data according to a user input of the electronic device 100. To this end, the input part 120 may include an input device such as a keyboard, a keypad, a dome switch, a touch panel, a touch key, a mouse, a menu button, etc.

The display part 130 displays display data according to an operation of the electronic device 100. The display part 130 is a liquid crystal display (LCD), a light-emitting diode (LED) display, an organic LED (OLED) display, a micro electromechanical system (MEMS) display, or an electronic paper display. The display part 130 may be combined with the input part 120 and implemented as a touchscreen.

The memory 140 stores operation programs of the electronic device 100. In particular, the memory 140 may store at least one neural network that may perform human parsing on the input image data. In particular, the memory 140 may store a height-and-width distribution attention parsing (HWAP) module for performing height distribution attention parsing and width distribution attention parsing on the image data.

The controller 150 performs height distribution, width distribution, height distribution attention parsing, width distribution attention parsing, distribution loss design, object learning, and spatial distribution enhancement feature improvement on the image data for human parsing using spatial distribution. Each operation performed by the controller 150 will be described below.

First, the controller 150 checks ground truth values of the input image data (hereinafter, "input data") and calculates partial spatial distribution of a human in vertical and horizontal directions using the checked ground truth values. Here, the calculated partial spatial distribution in the vertical direction is referred to as a height distribution map, and the calculated partial spatial distribution in the horizontal direction is referred to as a width distribution map. A distribution map allows a network to learn height and distribution context in advance and consider the spatial distribution of another category under the constraint of distribution loss.

<Height Distribution and Width Distribution>

A height distribution map and a width distribution map are constructed using ground truth values of a training set. Here, an input image is I, a ground truth value is G, and a matrix M having an H*W*N size is generated by encoding each class integer label using one-hot encoding. H represents a height of the input image, W represents a width of the input image, and N represents a class number. In each channel corresponding to the class number, the number of 1s is calculated in each of the height direction and the width direction and reflects height distribution and width distribution of the corresponding class. A height distribution map $D_h$ and a width distribution map $D_w$ based on the height distribution and the width distribution are calculated using Equations 1 and 2. $D_h$ has an H*N size, and $D_w$ has a W*N size. $D_h$ and $D_w$ are ground truth values of class height distribution and class width distribution, respectively.

$$D_h(h, n) = \sum_{i=1}^{w} M_{h,i,n}$$ [Equation 1]

$$D_w(n, w) = \sum_{i=1}^{H} M_{i,w,n}$$ [Equation 2]

The controller 150 calculates a class spatial-distribution ground truth value $D_{hw}$ which reflects spatial distribution of all classes by accumulating $D'_h$ and $D'_w$ which are obtained by interpolating $D_h$ and $D_w$ in the width and height directions. The class spatial-distribution ground truth value $D_{hw}$ is calculated using Equation 3 below.

$$D_{hw}(h, w) = \sum_{i=0}^{N} (D'_h(h, w, i) + D'_w(h, w, i))$$ [Equation 3]

<Height Distribution Attention Parsing and Width Distribution Attention Parsing>

The controller 150 performs height distribution attention parsing and width distribution attention parsing (i.e., HWAP) using the HWAP module. HWAP generates channel-specific weight values for each individual row in height-specific context information and generates channel-specific weight values for each individual column in width-specific context information. When an input feature map is input, the controller 150 generates a height-channel-wise attention map $A_h$ (hereinafter, "height attention map") and a width-channel-wise attention map $A_w$ (hereinafter, "width attention map"). $A_h$ and $A_w$ are respectively generated under supervision of height distribution loss and width distribution loss and include channel-specific height-wise and width-wise scaling coefficients.

More specifically, to reduce a channel size, the controller 150 applies 1×1 convolution and a batch normalization (BN) layer. The controller 150 extracts a height-channel feature map $Z_h$ and a width-channel feature map $Z_w$ using height-wise pooling and width-wise pooling. The controller 150 uses average pooling.

After average pooling, three 1D convolution layers are consecutively used. Two of the three 1D convolution layers are applied to the BN layer, and the other one is activated by a sigmoid function to generate an attention map. Here, three convolutional operations are shown in Equations 4 and 5 below.

$$A'_h = I'_{up}(A_h) = i'_{up}(\sigma(conv_3(\delta(conv_2(\delta(conv_1(z_h))))))) \quad \text{[Equation 4]}$$

$$A'_w = I'_{up}(A_w) = i''_{up}(\sigma(conv_1(\delta(conv_2(\delta(conv_1(z_w))))))) \quad \text{[Equation 5]}$$

Here, $\sigma$ denotes the sigmoid function, $\delta$ denotes a rectified linear activation (ReLU) function, and $conv_i$ denotes an $i^{th}$ 1D convolution layer. To produce a normalization effect, the first convolution layer reduces a channel number C of $Z_h$ and $Z_w$ to $$\frac{1}{\gamma}.$$

Here, $\gamma$ denotes a hypervariable, the second convolution layer restores the channel number, and the third convolution layer, that is, the final layer, increases the channel number to the same value as an input feature map $X_i$. $A_h$ denotes an important channel in each individual row, and $A_w$ denotes an important channel in each individual column.

Subsequently, the controller 150 interpolates $A_h$ and $A_w$ to the same size as the input feature map and multiplies $A_h$ and $A_w$ by the input feature map to acquire a height attention scale feature map and a width attention scale feature map. The controller 150 concatenates the two acquired scale feature maps to acquire a finally scaled feature map.

More specifically, the controller 150 applies $i'_{up}$ and $i''_{up}$, to which bilinear interpolation operation is applied, to the corresponding attention maps, thereby expanding the attention maps to have the same dimensions as the input feature map $X_i$. After the attention maps are acquired, the input feature map $X_i$ is converted into an improved feature map $X_o$ which is newly represented. Here, the improved feature map $X_o$ which is newly represented may be acquired by combining $X_h$ and $X_w$ which are two scaled feature maps. Also, $X_h$ is derived from element-wise multiplication between $A_h$ and $X_i$, and $X_w$ is derived from element-wise multiplication between $A'_w$ and $X_i$. The improved feature map $X_o$ which is newly represented is calculated according to Equation 6 below.

$$X_o = cat(X_h, X_w) \quad \text{[Equation 6]}$$
$$= cat(\psi \times A'_h \times X_i, \varphi \times A'_w \times X_i)$$

Here, $\psi$ and $\sigma$ denote learnable weight parameters.

<Distribution Loss Design>

The spatial distribution of various human body categories may be set on the basis of ground truth values. The controller 150 applies distribution loss to force the network to model distribution rules of each category. In the distribution loss, class spatial distribution in vertical and horizontal directions, from which the network generates distribution situation information, is taken into consideration.

When ground truth values are given as an input, each of vertical and horizontal class distribution ground truth values may be calculated. Accordingly, the network may be guided using the distribution ground truth values such that class distribution may be learned first. Pixels of each column of a height-channel prior map and pixels of each row of a width-channel prior map represent relevant category distribution at vertical and horizontal positions.

Predicted distribution prior maps $P_h$ and $P_w$ have a size of H*N and a size of N*W, respectively. H is the height of a feature map, N is the class number, and W is the width. The height-channel prior map is $\{P_{i,j} \in P_h, i \in [1, H], j \in [1, N]\}$, the width-channel prior map is $\{P'_{i,j} \in P_w, i \in [1, N], j \in [1, W]\}$, a ground truth height-channel attention map is $\{a_{i,j} \in D_h, i \in [1, H], j \in [1, N]\}$ and a ground truth height-channel attention map is $\{a'_{i,j} \in D_w, i \in [1, N], j \in [1, W]\}$. Here, a height loss value and a width loss value are as shown in Equations 7 and 8, respectively.

$$l_h = \frac{1}{H \times N} \sum_{i=1}^{H} \sum_{j=1}^{N} (a_{i,j} - p_{i,j})^2 \quad \text{[Equation 7]}$$

$$l_w = \frac{1}{N \times W} \sum_{i=1}^{N} \sum_{j=1}^{W} (a'_{i,j} - p'_{i,j})^2 \quad \text{[Equation 8]}$$

Also, a final distribution loss rate $l_d$ is as shown in Equation 9.

$$l_d = \alpha * l_h + \beta * l_w \quad \text{[Equation 9]}$$

Here, $\alpha$ and $\beta$ denote balance weights for class vertical and horizontal distribution loss values, and each may be set to 1.

<Object Learning>

In the present invention, context embedding with edge perceiving (CE2P) is used as a baseline. A baseline network includes a pyramid pooling module, a high-resolution embedding module, and an edge-perceiving module. A CE2P output includes two parsing results and one edge prediction. Accordingly, a total loss of CE2P may be as shown in Equation 10.

$$L_{baseline} = L_{parsing} + L_{edge} + L_{edge-parsing} \quad \text{[Equation 10]}$$

Here, $L_{edge}$ denotes a weighted cross-entropy loss between a predicted edge map generated through an edge recognition module and an edge label map. $L_{parsing}$ denotes a cross-entropy loss between a parsing map of a high-resolution module and human parsing ground truth values. $L_{edge-parsing}$ denotes another cross-entropy loss between a parsing label and a final parsing result value after feature maps of an edge prediction module are combined.

HWAP may be added to the pyramid pooling module and the high-resolution module. Accordingly, a final loss function is as shown in Equation 11.

$$L = \tau \times L_{baseline} + \gamma \times l_d \qquad \text{[Equation 11]}$$

Here, $\tau$ and $\gamma$ denote weight hyperparameters, and weights thereof may be set to 1 and 40, respectively.

<Spatial Distribution Enhancement Feature Improvement>

The controller 150 improves a spatial distribution enhancement feature by adding a non-local module to a terminal of the HWAP module. The non-local module is used for capturing long-distance context shape information of each pixel. Various feature representations are very important for human parsing. The non-local module encodes a wide range of context information for modeling abundant context relationships of spatial distribution enhancement features. To this end, the non-local module is implemented as a ResNet-101 and adaptively aggregates the input data and spatial context in second and fourth block outputs of the ResNet-101 in connection with each other in a channel dimension.

The input data, a low-level representation, and a high-level representation are integrated into one mixed feature representation, and a correlation between class distribution enhancement features is calculated by matrix multiplication with the mixed feature representation. In this way, according to the present invention, it is possible to increase the accuracy of human parsing analysis even without using pose information of an object included in input data. In addition, since the present invention does not use pose information of an object included in the input data, it is possible to perform human parsing on a plurality of objects included in one piece of input data.

Figure 2:
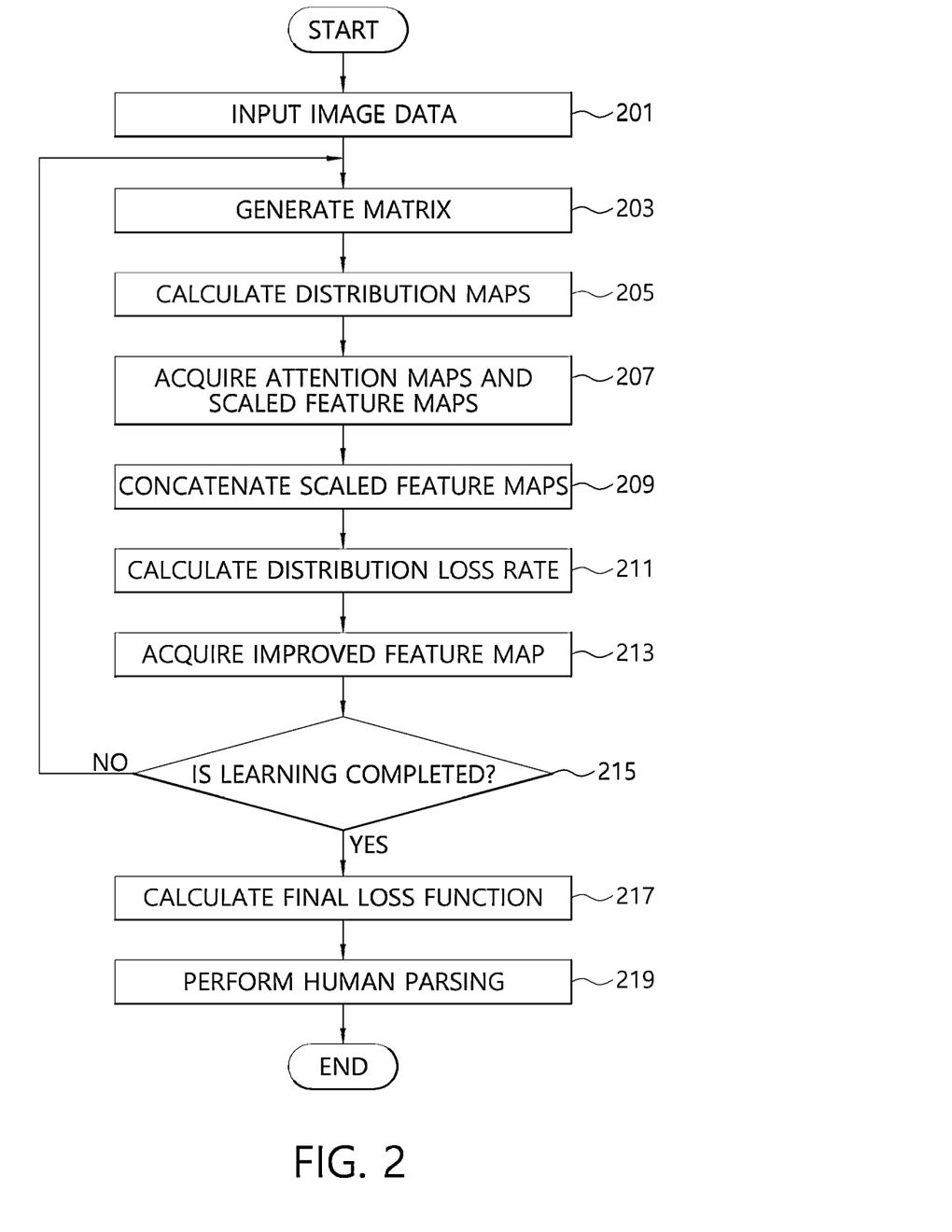
FIG. 2 is a flowchart illustrating a method for human parsing according to an exemplary embodiment of the present invention.
Figure 3:
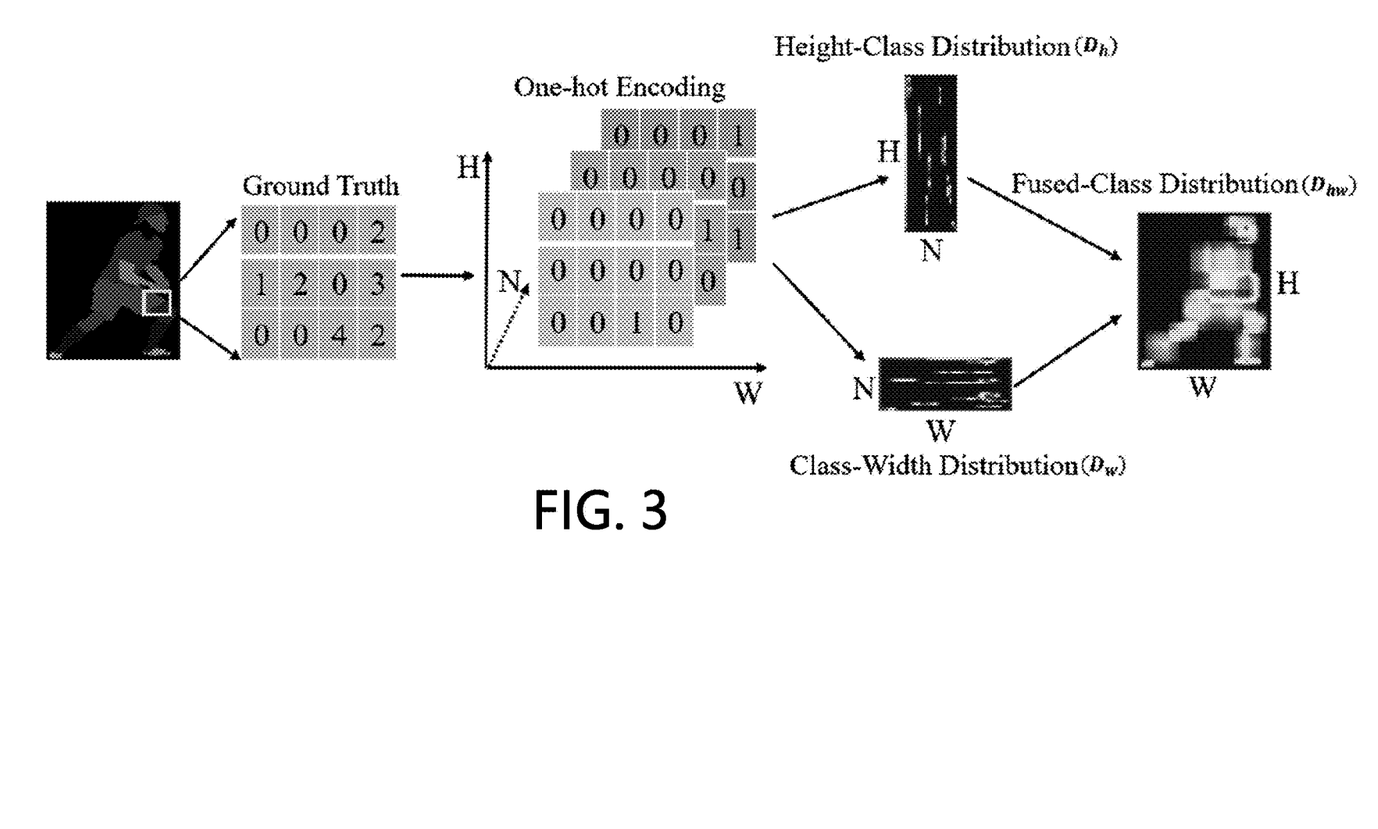
FIG. 3 is a diagram illustrating a method of calculating height and width distributions of different body parts according to an exemplary embodiment of the present invention.
Figure 4:
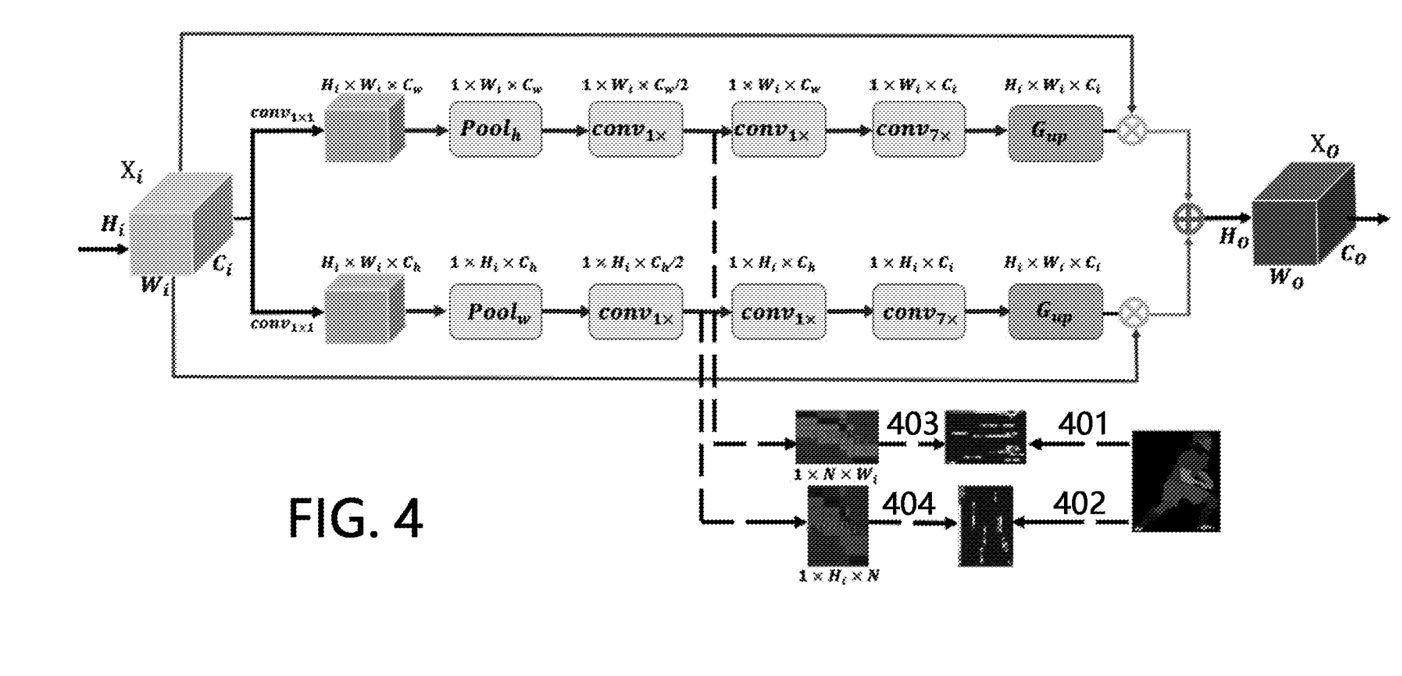
FIG. 4 is a diagram illustrating a structure of a height-and-width distribution attention parsing (HWAP) module according to an exemplary embodiment of the present invention.

FIG. 2 is a flowchart illustrating a method for human parsing according to an exemplary embodiment of the present invention. FIG. 3 is a diagram illustrating a method of calculating height and width distributions of different body parts according to an exemplary embodiment of the present invention. FIG. 4 is a diagram illustrating a structure of an HWAP module according to an exemplary embodiment of the present invention.

Referring to FIGS. 2 to 4, in an operation 201, the controller 150 receives at least one piece of image data and ground truth values each corresponding to one piece of image data for human parsing. In an operation 203, the controller 150 generates a matrix for the input image data (hereinafter, "input data"). The controller 150 generates a matrix having a size of height*width*class number by encoding each class integer label of the ground truth values using one-hot encoding. As shown in FIG. 3, the number of 1s in each channel is calculated in the height and width directions and reflects height distribution and width distribution of a corresponding class.

Subsequently, in an operation 205, the controller 150 calculates a height distribution map $D_h$ and a width distribution map $D_w$ by applying the generated matrix to Equations 1 and 2. Here, the height distribution map may have a size of height*class number, and the width distribution map may have a size of width*class number. The height distribution map and width distribution map are a class height-distribution ground truth value and a class width-distribution ground truth value, respectively.

In addition, the controller 150 interpolates each of the height distribution map and the width distribution map in the width and height directions to calculate an interpolated height distribution map and an interpolated width distribution map. Then, the controller 150 accumulates the interpolated height distribution map and the interpolated width distribution map as shown in Equation 3 to calculate a class spatial-distribution ground truth value $D_{hw}$ having a size of height*width and reflecting spatial distribution of all classes.

In an operation 207, the controller 150 acquires an attention map and a scaled feature map. To this end, the controller 150 uses the HWAP module of FIG. 4. Using the HWAP module, the controller 150 generates channel-specific weight values for all individual rows from height-specific context information and generates channel-specific weight values for all individual columns from width-specific context information.

In FIG. 4, $X_i$ denotes a feature map for an input i (hereinafter, "input feature map"), and $X_o$ denotes a feature map for an output o (hereinafter, "output feature map"). $X_i$ converges to $H_i*W_i*C_i$, and $X_o$ converges to $H_o*W_o*C_o$. Here, C denotes a channel number, and H and W denote the height and width of a feature map, respectively. The HWAP module generates a height-channel-wise attention map $A_h$ (hereinafter, "height attention map") and a width-channel-wise attention map $A_w$ (hereinafter, "width attention map") from the input feature map $X_i$. The height-channel-wise attention map $A_h$ and the width-channel-wise attention map $A_w$ are respectively generated under supervision of height distribution loss and width distribution loss and respectively include channel-specific height-wise and width-wise scaling coefficients. In FIG. 4, reference numerals 401 and 402 represent processes of calculating the height distribution map $D_h$ and the width distribution map $D_w$ using width class distribution and height class distribution calculated on the basis of the input image, and reference numerals 403 and 404 respectively represent processes of calculating the width attention map $A_w$ and the height attention map $A_h$ by applying width distribution loss and height distribution loss to the input feature map $X_i$.

More specifically, to reduce a channel size, the HWAP module applies 1×1 convolution and a BN layer. The HWAP module extracts a height-channel feature map $Z_h$ and a width-channel feature map $Z_w$ using height-wise pooling and width-wise pooling. Here, average pooling is used for HWAP.

After average pooling, three 1D convolution layers are consecutively used. Two of the three 1D convolution layers are applied to the BN layer, and the other one is activated by a sigmoid function to generate an attention map. As shown in FIG. 4, convolution kernel sizes of the height-channel feature map are 3*1, 1*1, and k*1, and convolution kernel sizes of the width-channel feature map are 1*3, 1*1, and 1*k. Here, k denotes the kernel size of a 1D filter and is set to, for example, 7. Three convolution operations are performed using Equations 4 and 5.

Subsequently, in an operation 209, the controller 150 concatenates the scaled feature maps. To this end, the controller 150 continuously uses the HWAP module of FIG. 4. Using the HWAP module, the controller 150 interpolates the height attention map $A_h$ and the width attention map $A_w$ to the same size as the input feature map $X_i$ and multiplies the interpolated height attention map and width attention map by the input feature map $X_i$ to acquire a height attention scale feature map $X_h$ and a width attention scale feature map $X_w$. The controller 150 concatenates the two acquired scale feature maps using the HWAP module.

Subsequently, in an operation 211, the controller 150 calculates a distribution loss rate. The controller 150 applies distribution loss to force a network to model distribution rules of each category. In the distribution loss, class spatial distribution in vertical and horizontal directions, from which the network generates distribution situation information, is taken into consideration.

The controller 150 may calculate each of vertical and horizontal class distribution ground truth values using the ground truth values given as an input. Accordingly, the network may be guided using the distribution ground truth values such that class distribution may be learned first. Pixels of each column of a height-channel prior map and pixels of each row of a width-channel prior map represent relevant category distribution at vertical and horizontal positions.

Predicted distribution prior maps $P_h$ and $P_w$ have a size of H*N and a size of N*W, respectively. H denotes the height of a feature map, N denotes the class number, and W denotes the width. A height loss value and a width loss value may be respectively calculated using Equations 7 and 8 above, and a final distribution loss rate may be calculated using Equation 9 above. The controller 150 may update a weight of the HWAP module on the basis of the calculated final distribution loss rate.

Subsequently, in an operation 213, the controller 150 acquires an improved feature map $X_o$ using the HWAP module. The controller 150 applies $i'_{up}$ and $i''_{up}$, to which bilinear interpolation operation is applied, to the corresponding attention maps, thereby expanding the attention maps to have the same dimensions as the input feature map $X_i$. After the attention maps are acquired, the input feature map $X_i$ is converted into the improved feature map $X_o$ which is newly represented. Here, the improved feature map $X_o$ which is newly represented may be acquired by combining $X_h$ and $X_w$ which are the two scaled feature maps. Also, the height attention scale feature map $X_h$ is derived from element-wise multiplication between the height attention map $A'_h$, which is obtained by interpolating the height attention map $A_h$, and the input feature map $X_i$, and the width attention scale feature map $X_w$ is derived from element-wise multiplication between $A'_w$, which is obtained by interpolating the width attention map $A_w$, and the input feature map $X_i$. The improved feature map $X_o$ which is newly represented is calculated according to Equation 6 above.

In an operation 215, the controller 150 determines whether learning of the input data which is input in the operation 201 is completed. When it is determined in the operation 215 that the learning of the input data is completed, the controller 150 performs an operation 217. In the operation 217, the controller 150 updates a final loss function according to Equations 10 and 11 above. Then, the controller 150 may update weights of all networks for human parsing on the basis of the updated final loss function. Subsequently, the controller 150 performs an operation 219. In the operation 219, when the learning of the input data is completed, the controller 150 may perform human parsing on the input data and display a human parsing result on the display part 130. On the other hand, when the learning of the input data is not completed, the controller 150 may return to the operation 203 to perform the above operations again.

As described above, the device for human parsing according to the present invention checks spatial distribution features of body parts using an attention mechanism based on spatial distribution according to spatial statistics. Since it is unnecessary to down-sample ground truth values or perform location encoding, there is a cost-efficiency effect in that it is possible to minimize memory use and time consumption.

Exemplary embodiments of the present invention disclosed in this specification and the drawings are merely specific examples for easily describing the technical content of the present invention and helping understanding of the present invention and do not limit the scope of the present invention. Accordingly, the scope of the present invention should be construed as including all modifications or alterations derived from the technical spirit of the present invention as well as the exemplary embodiments disclosed herein.

What is claimed is:

1. A method for human parsing, the method comprising:
   receiving, by a controller, at least one piece of image data and ground truth values for human parsing;
   generating, by the controller, a height distribution map and a width distribution map for the image data;
   acquiring, by the controller, attention maps and scaled feature maps for each of a height and a width of the image data using the distribution maps;
   concatenating, by the controller, the scaled feature maps and calculating a distribution loss rates for each of the height and the width;
   acquiring, by the controller, an improved feature map on the basis of the calculated distribution loss rates; and
   performing, by the controller, human parsing on an object included in the image data using the improved feature map.

2. The method of claim 1, wherein the generating of the height distribution map comprises:
   encoding each class integer label of the ground truth values to generate a matrix; and
   generating the height distribution map having a size of the height of the image data*a class number and generating the width distribution map having a size of the width of the image data*the class number.

3. The method of claim 2, further comprising, after the generating of the height distribution map, accumulating, by the controller, the height distribution map and the width distribution map, which are interpolated according to the width and the height, to acquire a class spatial-distribution ground truth value which has a size of the height*the width and reflects spatial distribution of all classes.

4. The method of claim 3, wherein the acquiring of the attention map comprises acquiring the attention maps for each of the height and the width on the basis of an input feature map of the image data.

5. The method of claim 4, further comprising, after the acquiring of the attention maps, interpolating, by the controller, the attention maps to the same size as the input feature map and considering the interpolated attention maps and the input feature map to acquire the scaled feature maps for each of the height and the width.

6. The method of claim 5, wherein the calculating of the distribution loss rates comprises:
   applying different weights to the calculated distribution loss rates to calculate a final distribution loss rate.

7. The method of claim 6, wherein the calculating of the distribution loss rates comprises:
   calculating a distribution loss rate for the height using the height, the class number, a height-channel prior map, and a ground truth height-channel attention map; and
   calculating a distribution loss rate for the width using the width, the class number, a width-channel prior map, and a ground truth width-channel attention map.

8. The method of claim 7, wherein the acquiring of the improved feature map comprises acquiring the improved feature map for the image data on the basis of the calculated final distribution loss rate.

9. The method of claim 8, further comprising, after the performing of the human parsing on the object, displaying, by the controller, a human parsing result for the image data when learning of the image data is completed.

10. A device for human parsing, the device comprising:
an input part configured to receive at least one piece of image data and ground truth values for human parsing; and
a controller configured to:
generate a height distribution map and a width distribution map for the image data;
acquire attention maps and scaled feature maps for each of a height and a width of the image data using the distribution maps;
concatenate the scaled feature maps and calculate a distribution loss rates for each of the height and the width;
acquire an improved feature map on the basis of the calculated distribution loss rates; and
perform human parsing on an object included in the image data using the improved feature map.

11. The device of claim 10, wherein the controller configured to:
encode each class integer label of the ground truth values to generate a matrix;
generate the height distribution map having a size of the height of the image data*a class number; and
generate the width distribution map having a size of the width of the image data*the class number.

12. The device of claim 11, wherein the controller configured to:
accumulate the height distribution map and the width distribution map, which are interpolated according to the width and the height, to acquire a class spatial-distribution ground truth value which has a size of the height*the width and reflects spatial distribution of all classes.

13. The device of claim 12, wherein the controller configured to:
acquire the attention maps for each of the height and the width on the basis of an input feature map of the image data.

14. The device of claim 13, wherein the controller configured to:
interpolate the attention maps to the same size as the input feature map and consider the interpolated attention maps and the input feature map to acquire the scaled feature maps for each of the height and the width.

15. The device of claim 14, wherein the controller configured to:
calculate a final distribution loss rate by applying different weights to the calculated distribution loss rates.

16. The device of claim 15, wherein the controller configured to:
calculate a distribution loss rate for the height using the height, the class number, a height-channel prior map, and a ground truth height-channel attention map; and
calculate a distribution loss rate for the width using the width, the class number, a width-channel prior map, and a ground truth width-channel attention map.

17. The device of claim 16, wherein the controller configured to:
acquire the improved feature map for the image data on the basis of the calculated final distribution loss rate.

18. The device of claim 17, wherein the controller configured to:
derive a human parsing result for the image data when learning of the image data is completed.

* * * * *